United States Patent [19]
Bobo et al.

[11] Patent Number: 5,143,499
[45] Date of Patent: Sep. 1, 1992

[54] DEFORMABLE CYLINDER LOCKNUT

[75] Inventors: Melvin Bobo, Cincinnati; Peter W. Mueller, Morrow; Thomas F. McClure, Middletown, all of Ohio

[73] Assignee: General Electric Company, Cincinnati, Ohio

[21] Appl. No.: 689,206

[22] Filed: Apr. 22, 1991

[51] Int. Cl.$^5$ .................................. F16B 39/284
[52] U.S. Cl. ................................. 411/247; 411/282; 411/324; 411/902; 411/937; 60/39.091
[58] Field of Search ............... 411/247, 254, 260, 280, 411/281, 282, 436, 928, 937.1, 937, 324, 902; 60/39.091, 39.092

[56] References Cited

U.S. PATENT DOCUMENTS

| | | |
|---|---|---|
| 910,678 | 1/1909 | Hardin . |
| 1,657,244 | 1/1928 | Dardelet . |
| 2,314,728 | 3/1943 | Murphy ............................ 411/247 |
| 2,381,111 | 8/1945 | Chandler ........................... 411/280 |
| 2,870,668 | 1/1959 | Flahaut . |
| 3,142,325 | 7/1964 | Swanstrom . |
| 3,352,342 | 11/1967 | Jacobson ........................... 411/282 |
| 3,422,869 | 1/1969 | Lanius, Jr. ........................ 411/254 |
| 3,459,249 | 8/1969 | Jordan et al. ..................... 411/282 |
| 3,522,830 | 8/1970 | Blizard . |
| 3,587,701 | 6/1971 | Gold . |
| 3,702,628 | 11/1972 | Cosenza . |
| 3,868,079 | 2/1975 | Johnson ............................ 411/253 |

FOREIGN PATENT DOCUMENTS

| | | | |
|---|---|---|---|
| 1802372 | 5/1969 | Fed. Rep. of Germany ...... 411/280 |
| 1366609 | 6/1964 | France ............................. 411/281 |

Primary Examiner—Neill R. Wilson
Attorney, Agent, or Firm—John R. Rafter; Jerome C. Squillaro

[57] ABSTRACT

A temperature-sensitive, deformable cylinder locknut for use in high temperature applications associated with the operation of a gas turbine engine provides a secure fastener lock which resists torsional and vibrational stresses which may otherwise act to unseat and disengage the bolt. The locknut includes an undeformed threaded portion, an unthreaded transitional cylindrical sleeve portion, and a deformable unthreaded cylindrical portion. A threaded shaft contacts the cylindrical sleeve with reduced surface engagement to minimize frictional interaction and define a spiral volume therebetween to ensure the establishment of a non-permanent lock.

16 Claims, 2 Drawing Sheets

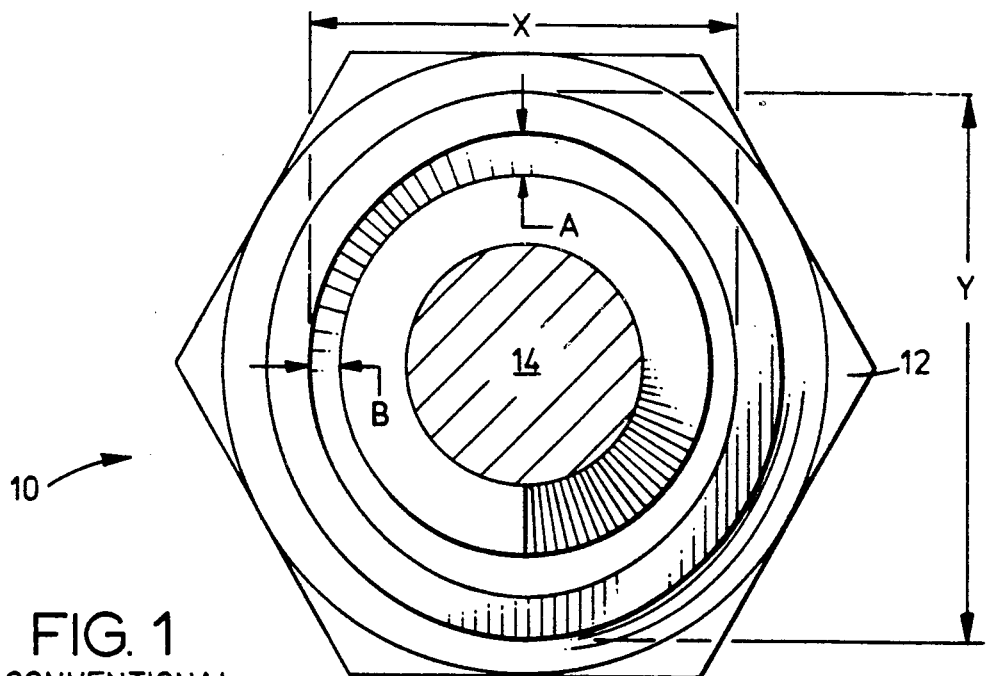
FIG. 1
CONVENTIONAL
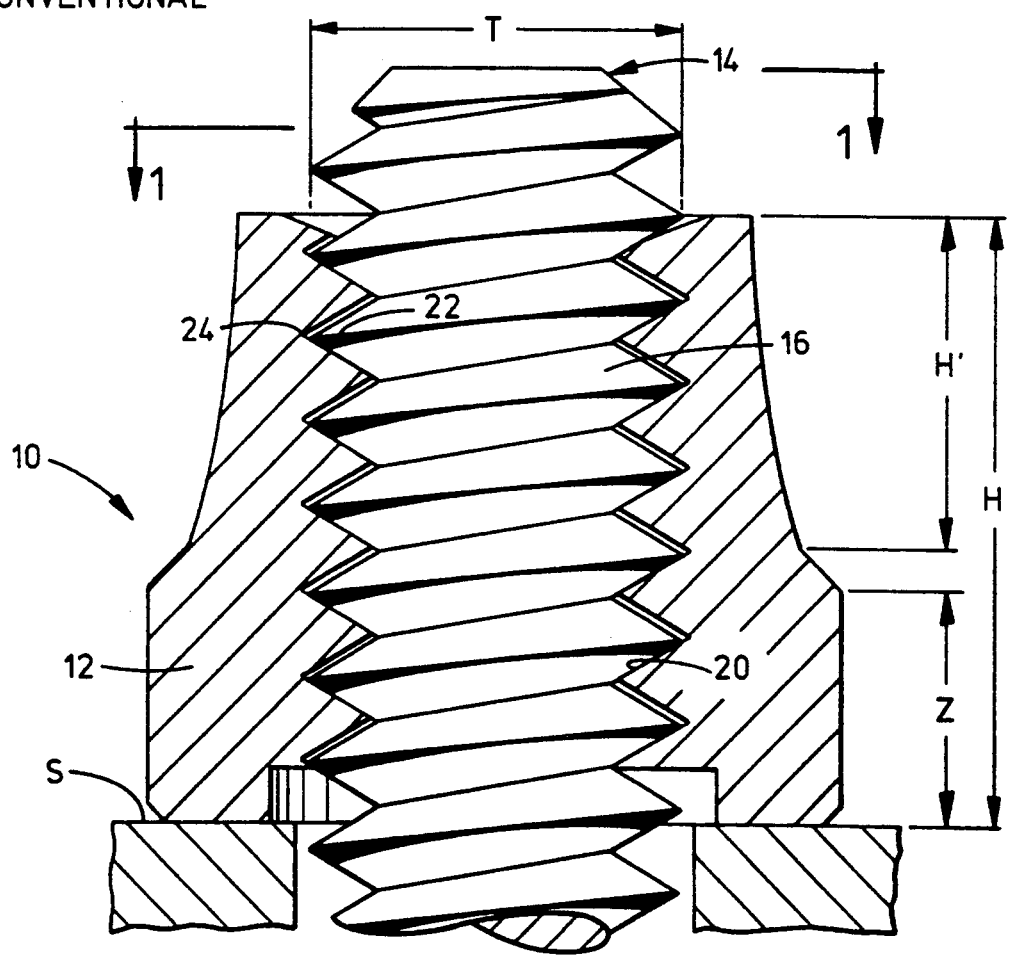
FIG. 2
CONVENTIONAL

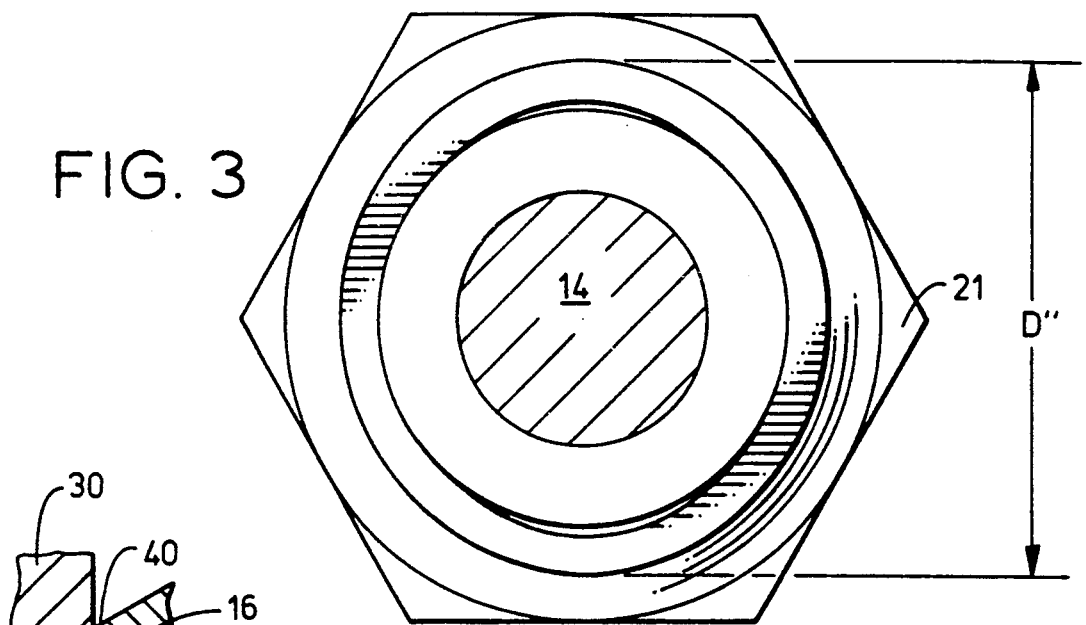
FIG. 3
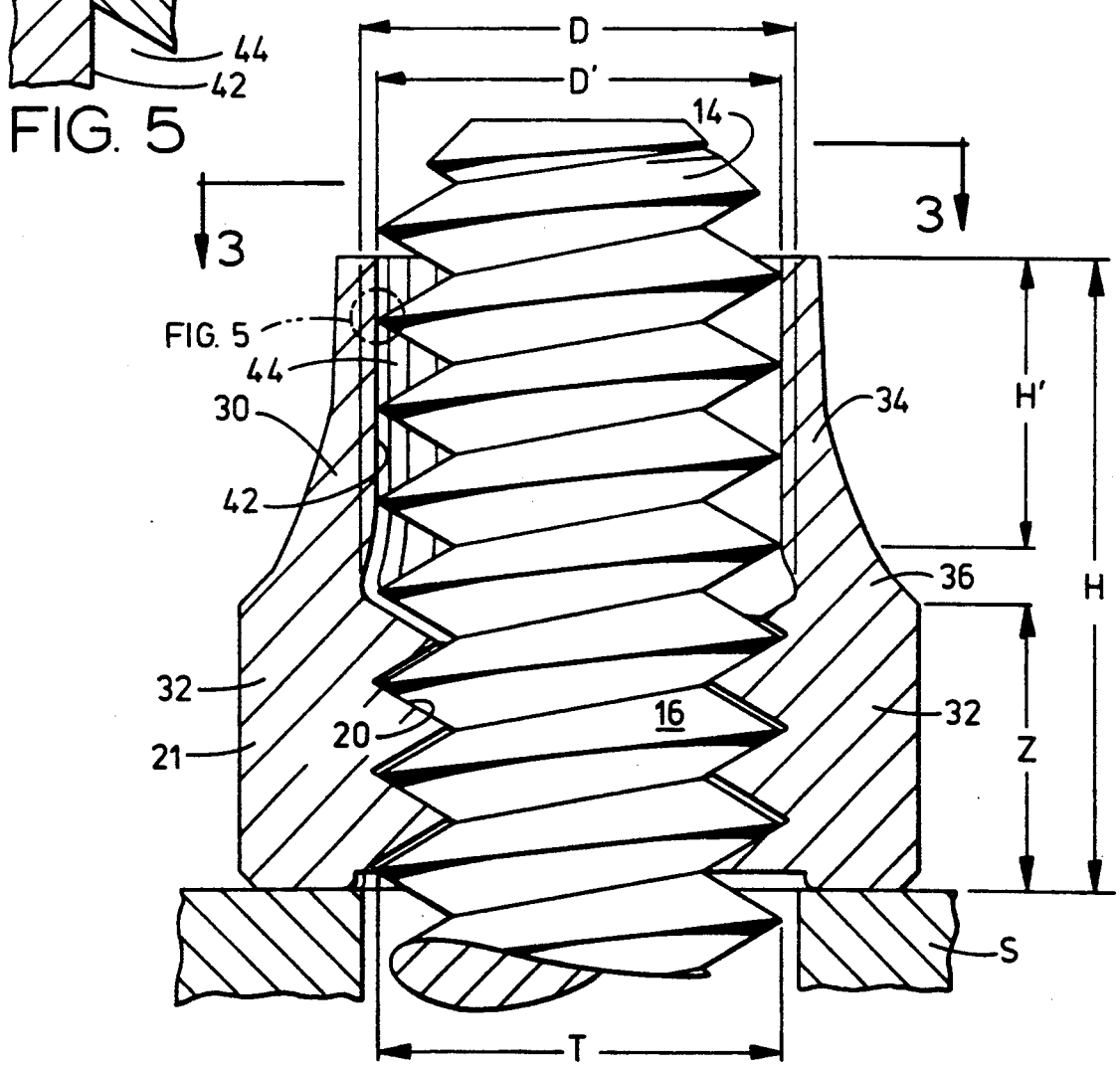
FIG. 5
FIG. 4

DEFORMABLE CYLINDER LOCKNUT

BACKGROUND OF THE INVENTION

The present invention relates to improvements in gas turbine engines and, more particularly, to an improved fastener for use in high temperature, and high vibration environments including a deformable cylinder locknut which lockingly engages a threaded bolt or stud shaft and torsionally seats against a surface by providing for thread-to-thread contact between the nut and bolt over a first undeformed threaded seat portion of the nut, minimal or no contact over a second unthreaded transitional portion of the nut and thread to sleeve contact over a third elliptically deformed unthreaded portion of the nut. In particular, the locknut of the present invention provides a controlled amount of high friction contact between a locknut and a mating bolt.

BACKGROUND OF THE INVENTION

Gas turbine engines, particularly those which are used in aircraft, are exposed to severe operating environments and ordinary threaded fasteners have proven unsatisfactory for these applications. The heat cycling and vibration produced by engine operation can cause ordinary loose fitting fasteners to loosen or become dislodged increasing the wear between adjacent parts allowing the parts to separate. Tight fitting fasteners have also proven unsatisfactory because engine operation subjects these to high temperatures and mechanical stresses which can cause the nut and bolt to become permanently affixed to each other and impair their removal. A nut and bolt are said to be permanently locked, affixed, or joined when either the nut or bolt is destroyed during dislodgement. Torsional force applied to a nut as it seats against a surface develops stress between adjacent threads. More particularly, the thread-to-thread contact in typical nut and bolt combinations provides extensive surface contact between the mating threads which, as a result of high temperature stress treatment, can become tightly joined by welding of uncoated surfaces or oxide build-up and subsequent wedging of loosened oxide between thread surfaces at disassembly that the nut cannot be dislodged from the bolt thread without exceeding the bolt shear limit and destroying the bolt. In these type fasteners, large contact areas exist and large force loads result.

Typical self-locking threaded fasteners or locknuts are threaded over their full height and rely on a self-locking feature which can take the form of an ovalization or deformation of a portion of the nut threads. In a specific embodiment, a portion of the nut away from the load carrying end is deformed elliptically so that locking is accomplished through an elastic rounding of the ellipse as a bolt threads through the nut. Nut and bolt combinations using full height threaded locknuts, achieve surface contact between mating threads over the full height of the nut and high friction contact with a full portion of elliptically deformed threads. The large amount of high friction surface contact between the threads give rise not only to high friction force interactions but also renders the nut and bolt combination susceptible to becoming permanently locked or welded due to the thermal or mechanical stresses applied to the combination. This unintended result should be avoided because aircraft engines require periodic service, and it is frequently necessary to separate various nut and bolt combinations.

One solution to this high friction contact area problem has been to apply a lubricant or friction-reducing material between the mating threads. While such lubricants and materials may work well initially, over time and under severe temperature and mechanical stress environments, these materials do not perform well. More particularly, these materials have been found to break down and contribute to oxide build-ups which can interfere with thread-to-thread engagement and further enhance a permanent lock between the nut and the bolt.

U.S. Pat. No. 910,678 to Hardin for a locknut discloses a nut having a threaded portion and an unthreaded portion. Similarly, the bolt has a threaded portion and an unthreaded portion. This patent teaches that the nut can be turned upon the bolt and when the smooth or plain interior wall 6 of the nut comes in contact with the plain portion of the bolt, the nut will be held frictionally against turning off of the bolt. Large surface-to-surface engagement for locking the nut onto the bolt are called for in this patent and the resulting device is susceptible to the above-identified high friction surface permanent lock.

OBJECTS OF THE INVENTION

In accordance with the present invention, it is desirable to provide a simple and reliable deformable locknut which minimizes, limits, and controls high friction engagement and oxide interference between nut and bolt combination and limits the maximum locking force which is achieved between the nut and the bolt to a force that is less than the shear limit of the bolt while at the same time providing a locking force sufficient to resist loosening or disengagement while the nut and bolt combination is subjected to high temperature and vibration cycling as might be caused by an operating gas turbine engine.

It is desirable to provide a locknut having a first zone of limited controlled friction contact which can be achieved by a deformable upper unthreaded cylindrical nut portion which can be deformed to provide an upper zone wherein controlled friction contact is achieved between the inwardly projecting portions of the deformed cylindrical sleeve and the adjacent thread.

It is additionally desirable to provide a locknut having an intermediate or transitional zone of minimal or no contact with the adjacent bolt threads to further limit the frictional engagement between the nut and bolt combination.

It is also desirable to provide a locknut having a third zone of undeformed, threaded contact between the nut and the bolt to provide limited and controlled amounts of surface to surface contact to thereby limit and control the frictional engagement between the nut and the bolt while still providing a load carrying surface and an interactive threaded track for seating the bolt within the nut and which field experience indicates is not susceptible to the before-identified high friction surface permanent lock.

SUMMARY OF THE INVENTION

In a preferred embodiment the deformable locknut of the present invention includes a lower threaded portion and an upper cylindrical sleeve portion which sleeve portion has an undeformed diameter slightly larger than the maximum thread diameter of the corresponding bolt. Before application to the bolt, the cylindrical sleeve portion can be mechanically deformed to provide a three zone locknut including a first elliptical or ovalized portion a second transitionally deformed or undeformed intermediate cylindrical portion followed by an undeformed threaded nut portion. The deformed sleeve portion has a minimum diameter less than the maximum diameter of the bolt thread and a maximum diameter minimally larger than the maximum diameter of the bolt thread. Thus, when deformed, the deformable locknut can engage the threads in a controlled manner to achieve a controlled amount of high friction locking force between the bolt threads and the deformed cylindrical sleeve and which controlled amount of locking force, even under the worst foreseeable circumstance, can be overcome by an applied force of an amount which is less than the amount which is required to shear or break the bolt. Further, the bolt threads contact the cylindrical sleeve and define a spiral cavity for receiving oxide residue which can otherwise become wedged between thread surfaces and give rise to a permanent lock.

These and other objects and features of the present invention will be apparent from a reading of the following description contained in this specification in conjunction with the disclosure found in the accompanying drawings in which:

BRIEF DESCRIPTION OF THE DRAWINGS

FIG. 1 is an illustration of a horizontal cross-sectional view of a conventional deformable locknut and bolt combination taken along lines 1—1 in FIG. 2.

FIG. 2 is an illustration of a vertical cross-sectional view of a conventional deformable locknut and bolt combination.

FIG. 3 is an illustration of a horizontal cross-sectional view of a deformable cylinder locknut and bolt combination in accordance with the present invention and taken along lines 3—3 in FIG. 4.

FIG. 4 is an illustration of a vertical cross-sectional view of a deformable cylinder locknut and bolt combination in accordance with the present invention.

FIG. 5 is an enlarged view of the details of the physical contact between a bolt thread tip and the deformed cylindrical nut portion shown in FIG. 4.

DETAILED DESCRIPTION OF THE INVENTION

Referring now to the drawings wherein like reference numerals will be used for like parts throughout, FIGS. 1 and 2 disclose a conventional locknut fastener 10, including a nut 12 having a height H and an associated bolt 14 having a maximum outside thread diameter T. A mechanical force can be applied to the nut 12 along its deformable height H' and the nut can be deformed or ovalized over its deformable height to exhibit a minimum diameter X and a maximum diameter Y wherein X<T<Y. As is shown, the spiral threads 16 of the bolt 14 overlap and interlace in threaded engagement with the threads 20 of the nut 12. A torsional force applied to the nut 12 applied over the bolt 14 seats the nut 12 against a surface S. Ovalization of the nut 12 can be seen from comparison of areas labeled A and B (FIG. 1) wherein the area A exhibits an enlargement of the area between the leading edge or tip 22 of the bolt thread 16 and the land 24 of the nut thread 20 indicating a minimal gap in the order of 1-2 mils has been achieved. Area B indicates no enlargement of the area between the leading edge 22 of the bolt thread 16 and the initial land 24 of the nut thread 20 indicating a no-gap condition exists in area B. Ovalization is indicated by distance across area A being different from the distance across area B and in the illustrated example A is shown as being greater than B signifying some ovalization has occurred.

As is illustrated in FIG. 2, the bolt 14 has a uniform diameter over substantially its entire length. Thus, the nut 12 and bolt 14 achieve close fitting threaded engagement over substantially their entire lengths. As the nut 12 is threaded onto the bolt 14 and the bolt threads 16 spiral through a first undeformed portion having a height Z and subsequently the bolt threads 16 engage the ovalized portions of the nut 12 along the length H' deovalize or round the nut 12 over length H', so that contact exists at area B and less contact exists at area A as the threads pass therethrough.

An illustration of a deformable cylinder locknut 21 in accordance with the present invention is shown in FIGS. 3 and 4 wherein the deformable locknut 21 is specially configured to include an upper cylindrical sleeve portion 30 for positioning proximate a bolt tip and a lower threaded portion 32 for positioning proximate a bolt head. The nut 21 can have a Height H and can be fabricated from an iron, cobalt, titanium or nickel based metal and be specially treated to achieve desired strength. As illustrated, the upper cylindrical sleeve portion 30 has been deformed to form a first elliptically shaped upper portion 34, a second transition portion 36 and a third lower undeformed portion 32. In a preferred embodiment, the nonuniform or ovalized upper portion 34 comprises 40-60% of the height H of the nut 21 and provides for a con-trolled and predetermined amount of locking torque as determined by the degree of ovalization over the height H' and the length of height H' itself which measurements specify the thread to sleeve contact in the first elliptically shaped upper portion 34. The lower threaded portion 32 can comprise a height Z in the range of 40-60% of the height H of the nut 21 to achieve the structural strength necessary to develop the full tensile strength of the bolt.

The cylindrical sleeve portion 30 prior to deformation can have a substantially cylindrical inner surface 42 and can have a diameter D minimally greater than the maximum outside diameter T (FIG. 2) of the thread 16 of the corresponding bolt 14. After deformation and before application to the bolt 14, the cylindrical sleeve portion 30 is deformed to exhibit a minimum diameter D' less than the maximum outside thread diameter T of the bolt 14 and a maximum diameter D" greater than the maximum outside thread diameter T of the bolt 14 and the original diameter D of the sleeve 30.

The following relations thus hold:

$$D' < T < D'' \qquad (1)$$

$$D' < D < D'' \qquad (2)$$

$$D > T \qquad (3)$$

As the bolt 14 is threaded into the nut 21, the threads 16 travel a spiral path through the nut threads 20 and cross over the transition portion 36 with little or no contact with the substantially cylindrical sleeve walls. As the threads contact the upper deformed sleeve 30, the threads pass through the deformed sleeve portion 34 and expand the minimum radius of this portion to be approximately equal to T the maximum outside thread diameter to ensure locking engagement between the bolt 16 and the nut 21 is achieved.

FIG. 5 is an enlarged illustration of the contact between the thread 16 and the upper cylindrical portion 30. More particularly, the thread 16 is shown to terminate in a flat nose 40 which makes planar engagement with an inner substantially cylindrical wall of the 42 of the cylindrical portion 30. The thread 16 intersects the wall 42 and forms a cavity 44 shaped as a spiral volume between the sleeve 30 and thread 16 which, as is explained below, affords the deformable locknut with particular advantage.

In operation in a high temperature, vibrational environment, such as an attachment to an operating gas turbine engine, it will be seen that the deformed cylinder locknut 21 has particular advantage in that it provides for seated engagement between mating bolt and nut threads 16 and 20 respectively along the lower threaded portion 32 of the nut 21 over the height Z to achieve the desired axial positioning of the nut and bolt relative to each other and thereby establish a required relation with the members being fastened. The intermediate portion 36 provides for minimal or no contact between the thread 16 and sleeve 30 and is provided to allow a range of deformations to be applied to cylindrical sleeve portion 30 of nut 21. The deformed upper sleeve portion 34 ensures that a minimum and controlled amount of friction sleeve-to-thread contact is produced to ensure locking engagement between the bolt 14 and the nut 21 is achieved while guaranteeing that the maximum breakaway force needed to dislodge nut 21 will not exceed the shear point of the bolt 14.

The cavity 44 shown in FIG. 5 between the cylindrical wall 42 and the thread 16 provides particular advantage in that material such as oxide, dislodged by interaction of threads 16 and 20, can be harmlessly collected within the cavity 44. Although a minor oxide can still become wedged between adjacent threads, a major portion of the loosened oxide is harmless if collected within the cavity 44. Thus, the dislodgement force required to overcome the oxide interference will be less than the shear limit of the bolt, and the nut and bolt contribution can therefore be characterized as non-permanently joined.

Prior deformable locknuts have employed full height threading and develop thread-to-thread contact between the nut and bolt. In the deformed cylinder locknut of present interest, the thread-to-thread contact surface area of nut and bolt is substantially reduced primarily because over the upper cylindrical portion 30 of the deformed cylinder locknut 21, the deformed cylinder locknut is substantially cylindrical and has no preformed thread depth. Over the lower portion 32 of the locknut the surface area of the thread-to-thread contact is consistent with prior conventional models. Based on the following analyses, the upper portion 30 of the deformed cylinder locknut provides approximately 25% or less of the conventional thread-to-thread contact and 25% or less opportunity for loosened oxide to interfere with and impair thread-to-thread movement. In cross-sectional view of a conventional locknut, such as that shown in FIG. 1, the thread tip comprises approximately 15 mils and thread flank comprises approximately 45 mils for a total contact length of approximately 60 mils. In the present invention, the thread contact length is limited to the thread tip only and consequently a 75% reduction in thread surface area contact is achieved.

Accordingly, the present invention provides a readily disengageable, but anti-vibrational locknut which provides a prespecified degree of controlled mechanical locking which increases with increasing temperature. In the gas turbine engine environment, wherein temperatures in excess of 650° C. can be achieved, the shank 16 and nut 21 expand radially outward. If the expansion coefficient of the bolt is larger than that of the nut high temperature stress increases the possibility that the nut and bolt combination can become welded together. It will therefore be recognized that the deformed cylinder locknut of the present invention has particular utility in high temperature applications, such as in operating gas turbine engines, wherein the deformed cylinder locknut provides a locking fastener for fixedly holding two members in a fixed and prespecified relationship, which fastener resists torsional disengagement as might otherwise result from temperature and vibrational cycling of the engine.

The deformed cylinder locknut 21 can be fabricated by providing a metal billet, shaping the exterior thereof to form a lower threaded portion 32 and an upper deformable portion 34 wherein the outside diameter of the deformable portion 34 is less than the outside diameter of the threaded portion 32. The billet can then be bored to form a thread receiving cavity and subsequently threaded over it full height H. Thereafter the upper cylindrical sleeve portion 30 is formed by boring out the threads 20 from above to a diameter D over length H'.

It is to be understood that this invention is not limited to the particular embodiment disclosed and numerous changes in the construction and application of the present invention can be made to achieve the desired results. The material of the bolt, nut and sleeve can be selected to achieve the desired degree of locking to resist torsional and vibrational forces exerted thereon. Further, the degree of radial and axial deformation can be varied to achieve the desired lock. In addition, various treatments can be applied to the integral locking structure of the present invention and in particular the threaded portions of the nut and bolt can be coated with a nonsilver material with reduced risk that the nut and bolt combination will become permanently affixed by materials loosened during dislodgement. Accordingly, an oxide tolerant deformable cylinder locknut is provided and it is, therefore, intended that the present invention shall cover all modifications coming within the true spirit and scope of this invention as claimed.

We claim:

1. A deformable cylinder locknut for application to a threaded shaft in a gas turbine engine, comprising
   means including a first threaded portion for threadedly receiving the threaded shaft therein; and a second deformable cylindrical sleeve portion for receiving the threaded shaft therein;
   said first and second portions being integrally and coaxially formed in a unitary structure wherein said cylindrical sleeve portion can be deformed elliptically to provide sleeve to thread locking force contact with a threaded surface of the shaft inserted therein.

2. The deformable cylinder locknut of claim 1 wherein said second portion includes a transition section for avoiding thread-to-sleeve contact.

3. The locknut of claim 2 wherein the shaft thread engages the cylindrical sleeve and defines a spiral cavity for receiving oxides dislodged from the shaft and nut to thereby eliminate wedging of loosened oxide between shaft and nut surfaces to avoid the establishment of a permanent lock between the shaft and nut.

4. In gas turbine engine, a deformable cylinder locknut for application to a threaded shaft comprising:
- first threaded means for threadedly receiving the threaded shaft therein;
- second deformable cylindrical sleeve means for receiving said threaded shaft therein;
- said first and second means being integrally formed in a unitary structure wherein said second cylindrical sleeve means can be deformed to elliptically provide thread-sleeve locking force contact with a thread surface of a bolt inserted therein.

5. The deformable cylinder locknut of claim 1, wherein the locknut has a height H and the cylindrical sleeve means has a height H' and wherein the ratio H'/H is in the range of 0.4–0.6.

6. The deformed cylinder locknut of claim 1, wherein said cylindrical means is unthreaded and exhibits an undeformed diameter D which is greater than or equal to the diameter of a corresponding shaft having a maximum thread diameter T.

7. The deformable cylinder locknut of claim 6, wherein said second means after deformation exhibits a minimum deformed diameter D' and a maximum deformed diameter D" wherein:

$$D' < T < D''$$ and $$D' < D < D''.$$

8. The deformable cylinder locknut of claim 1, wherein the second cylindrical means has a substantially cylindrical unthreaded interior surface.

9. The deformable cylinder locknut of claim 1, wherein greater than 50% of the interior circumference of the second cylindrical means is ovalized.

10. The deformable cylinder locknut of claim 1, wherein insertion of a shaft effects deformation of the cylindrical sleeve means to establish locking engagement.

11. The deformable cylinder locknut of claim 1, wherein said second cylindrical means includes an unthreaded transition portion having a surface remaining in spaced relation from the shaft threads.

12. The deformable cylinder locknut of claim 1, the locknut has a Height H and wherein the first threaded means has a height Z and the ratio of Z/H is in the range of 0.4–0.6.

13. The deformable cylinder locknut of claim 1, wherein unthreaded portion exhibits a tapered exterior diameter.

14. The deformable cylinder locknut of claim 1, wherein the shaft thread intersects said second cylindrical means and defines a cavity for harmlessly collecting thread oxide loosened during nut dislodgement.

15. The deformable cylinder locknut of claim 1, wherein said first means provides an area of high friction contact, the deformed portion of said second means provides an area of low friction contact, and said transition portion of said second means provides an area of no-friction contact.

16. The deformable cylinder locknut of claim 1, wherein said threaded portion is coated with a material selected from the class comprising moly-disulfide dry film for low temperature applications and boron-nitride for high temperature-applications.

* * * * *